P. J. STAAB.
CORN PICKING AND HUSKING MACHINE.
APPLICATION FILED AUG. 21, 1911.
1,131,800.
Patented Mar. 16, 1915.
2 SHEETS—SHEET 1.
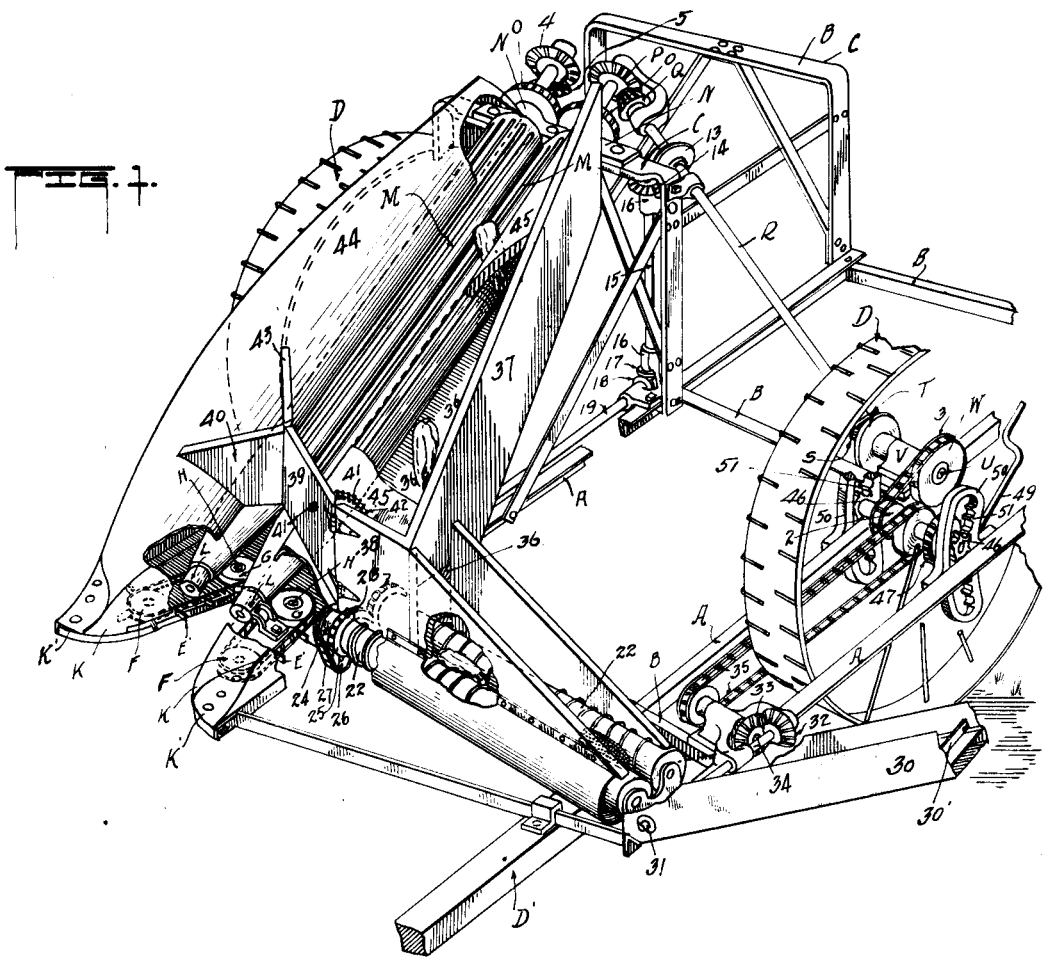
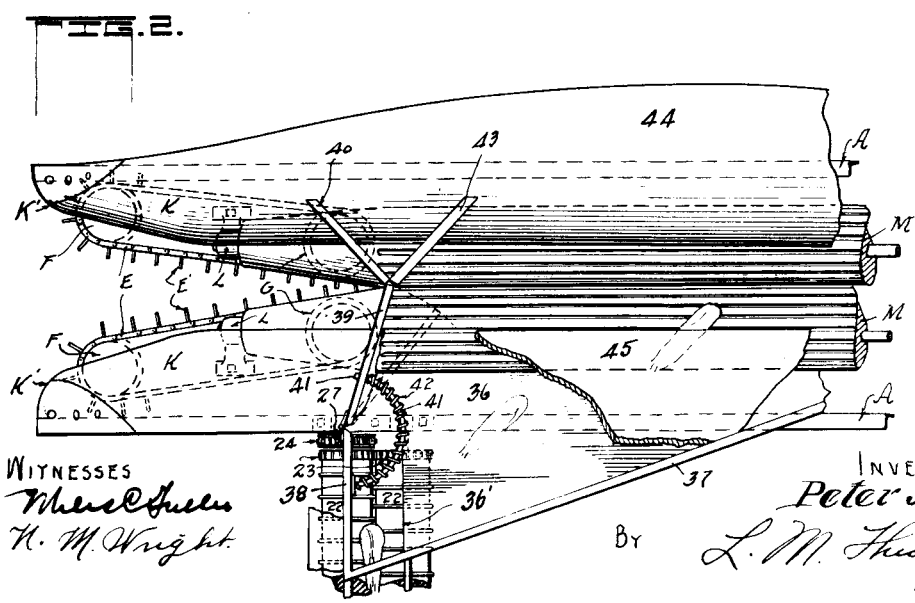
WITNESSES
INVENTOR
Peter J. Staab,
By L. M. Thurlow
Att'y

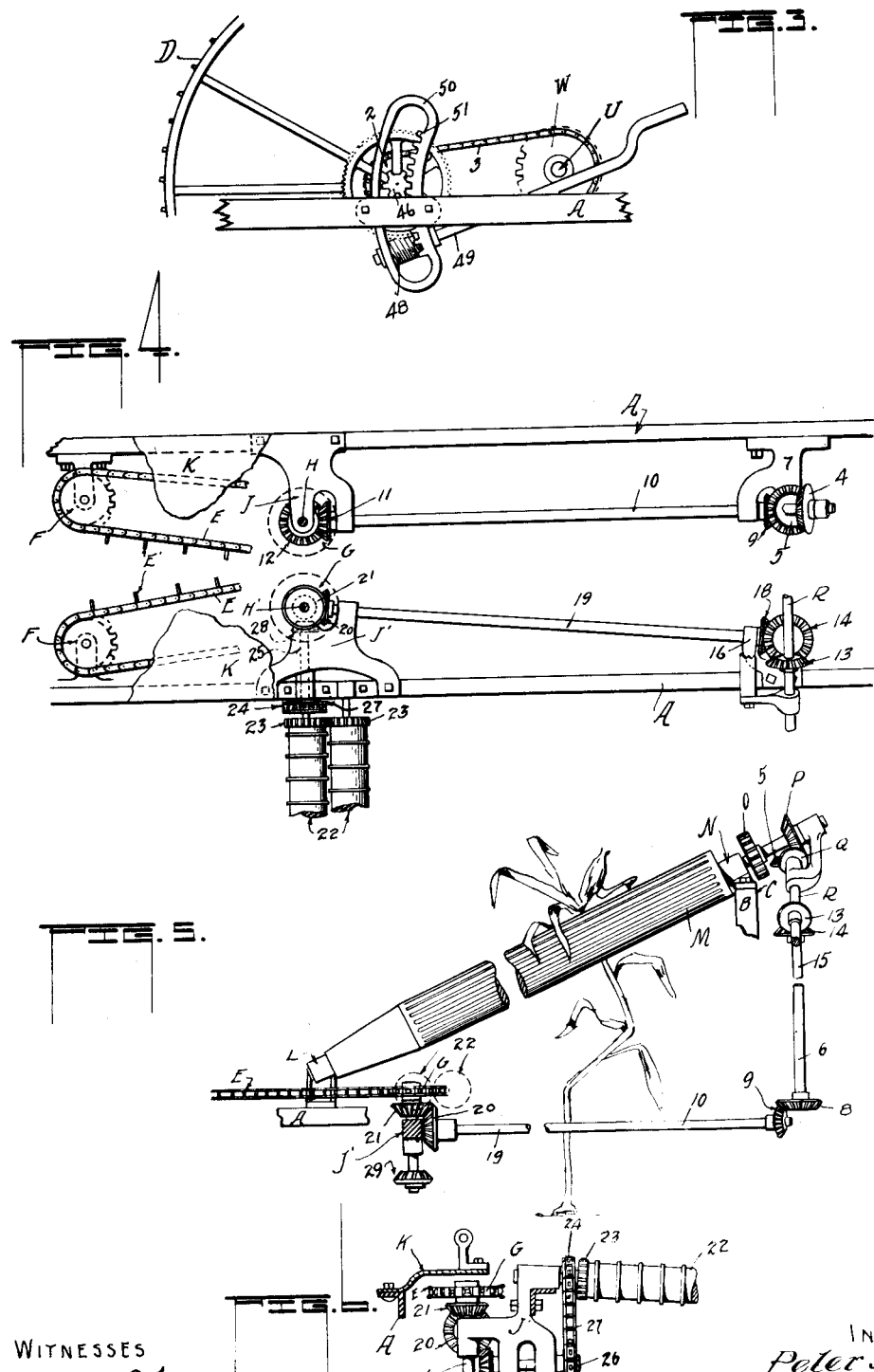

UNITED STATES PATENT OFFICE.

PETER J. STAAB, OF PEORIA, ILLINOIS.

CORN PICKING AND HUSKING MACHINE.

1,131,800.  Specification of Letters Patent.  Patented Mar. 16, 1915.

Application filed August 21, 1911.  Serial No. 645,183.

*To all whom it may concern:*

Be it known that I, PETER J. STAAB, citizen of the United States, residing at Peoria, in the county of Peoria and State of Illinois, have invented certain new and useful Improvements in Corn Picking and Husking Machines; and I do hereby declare that the following is a full, clear, and exact description of the invention, which will enable others skilled in the art to which it appertains to make and use the same.

This invention relates to a corn picking and husking machine; pertaining more particularly to a machine of the portable type that can be driven through the field. One of the objects is to provide a corn picking and husking machine that can be driven through standing corn and which will both pick and husk the ear and from which, if desired, the ears may be elevated to a wagon or other receptacle.

Another object is to construct a machine for picking and husking corn whose picking or snapping members are a pair of rolls inclined at an angle downwardly and forwardly, and to provide suitable gearing for driving them which will in no way interfere with or be in the way of the stalks of corn passing through the machine.

Another object is to provide a pair of picking rolls adapted to receive the stalks of corn, said stalks being drawn therethrough the ears being snapped from them and delivered by gravity into husking rolls provided to receive them.

Another object is to provide mechanism for picking corn and driving gear so disposed with regard to the driven parts that the machine is practically divided into two parts giving a clear pathway entirely through the machine for the stalks.

Another object of the invention is to provide for the snapping rolls of a corn picker, a valve which will admit the stalks to the said rolls but at the same time will prevent the ears removed from said stalks being lost from the machine.

Other objects and advantages will be pointed out herein aided by the accompanying drawings wherein:

Figure 1 shows a machine in perspective. Fig. 2 is a plan of part of the same. Fig. 3 is a side elevation of a raising and lowering mechanism. Fig. 4 is a plan of a part of the gearing. Fig. 5 is an elevation of part of the gearing shown in Fig. 4, and Fig. 6 is a front elevation of part of the same.

My picking and husking machine is distinguished from others of its class by its simplicity of construction and operation and by the fact that it presents a clear pathway for the passage of the stalks through it whereby a row of corn can be passed through without having to cut said stalks before snapping the ears therefrom, said stalks being drawn through the snapping rolls and left standing in the field, the ears being picked therefrom and delivered to proper husking rolls and cleaned of their coverings. It is necessary, where the corn is to be picked from the standing stalks, to provide a mechanism in which no parts will lie in or across the path which the stalks will take through the machine, otherwise trouble will be experienced in that the machine will become clogged and the draft increased and, incidentally, a loss of time would result. Again, a structure must be provided in which when the ears have been removed from the stalks by the snapping rolls provided for that purpose, they will be properly retained in the machine and guided into the husking rolls and further, the speed of travel of the various parts relatively must be such that the stalks will be drawn through the snapping rolls, and gotten out of the way so that the machine will not become overcrowded or clogged. Again, preferably there is provision for raising and lowering the machine so that the stalks which may have been blown down can be raised and as readily guided into the snapping rolls as those which stand upright. I have provided for all of these necessities and they will be understood clearly herein.

The main frame is made up, for example, of the sills A lying parallel to the line of advance, these being preferably of angle iron or the like, connected by suitable cross sills B, certain of which, at the rear of the implement, are arched as indicated at C in order to permit the stalks to readily pass beneath them. The frame is suitably mounted upon wheels D, one of them being the driving or "master wheel," provided, if desired, with usual lugs on its face to prevent slipping upon the ground. I provide any suitable means for raising and lowering the frame and this may be any ordinary lifting mechanism which will be described later, it being understood, however, that as to this portion I am not confined to any particular means so long as the vertical adjustment of the frame can be made.

D' indicates the usual tongue to which the horses are attached. At one side of the machine, or that side having the arches C, I mount suitable means for positively engaging and directing the stalks of corn rearward into the snapping rolls to be described later. The said means preferably consists of two separate sprocket chains or gatherers E provided with projecting flights or fingers E' and which lie at opposite sides of a row of corn whose ears are to be removed. I carry these chains upon pairs of sprocket wheels F, G, a front and rear one, the rear ones G being suitably carried on shafts H and H', in bearings J and J' secured to the frame member A, for example, as indicated in Fig. 4, the said shafts being vertically disposed in order that the chains will have a horizontal position. It is noted that by preference the front sprockets F are separated by a greater space than the rear sprockets G whereby to better engage and pick up the stalks which may stand or lie in positions otherwise than an upright one. Preferably a light platform K, Figs. 1 and 4, overlies the sprockets as shown in Fig. 6 so as to protect them and to furnish a support for the bearings L of the snapping rolls and also to constitute an outer and curved gathering-nose K'.

The rolls just mentioned are indicated by M, their forward ends being mounted in said bearings L, being inclined upwardly and rearwardly, their upper ends being carried in suitable bearings N, secured upon one of the arches C. The angle of inclination of the rolls is such as to produce the best results in operation. Their lower or forward ends are tapered, as clearly shown, to provide an easy entrance for the stalks, and rearwardly from the tapered portions they run in close proximity and are fluted longitudinally as is customary with rolls of the snapping type. At their said upper ends each is provided with a gear O to mesh with one another whereby they will be rotated in opposite directions. One of them carries a beveled gear P in mesh with a beveled pinion Q on the end of a shaft R. The other end of the latter shaft carries a similar pinion S in mesh with a beveled gear T on a shaft U, carried in a bearing V secured to the machine frame A B. The shaft U is provided with a sprocket W driven from the master wheel D through a sprocket 2 and sprocket chain 3, motion being thus imparted to the rolls M by the gearing described in a direction to draw the stalks down through them as the machine moves forward. The roll opposite that having the gear P carries a beveled gear 4 which meshes with a gear 5, Figs. 1 and 4, carried upon the upper end of a shaft 6, mounted in suitable bearings one of which is shown at 7 in Fig. 4. This shaft at its lower end carries a beveled gear 8 to drive a similar gear 9 on a horizontal shaft 10, one end being supported by a part of the said bearing 7, its other end by a part of one of the bearings J, before described. It carries at this end a beveled gear 11 in mesh with a similar one 12, upon the lower end of the shaft H, the direction of drive being such that the inner or working stretch of the sprocket chain E moves in a rearward direction or in the direction of the snapping rolls.

The shaft R, previously described, carries a beveled gear 13, in mesh with which is a similar gear 14 carried by a vertical shaft 15, having its bearings at 16 upon the main frame, the lower end of said shaft carrying a beveled gear 17 in mesh with a gear 18 on a horizontal shaft 19, whose end having said gear 18, is carried in an extension of one of the bearings 16 while its other end has a bearing in an extension of the bearing J' after the manner of the shaft 10. It also is provided with a beveled gear 20 in mesh with a similar gear 21 on the shaft H' carrying one of the sprockets G. This said gear 21 is placed on its shaft in an opposite position to that of the shaft H so that a movement is imparted to the sprocket chain E in a rearward direction as in the other case. Thus the inner stretches of the two sprocket chains E move in the same direction and all the gears described are of such a size or relation one to another that both chains are made to move practically at the same speed.

22 indicates a pair of husking rolls mounted on the frame members A in suitable manner and preferably inclined toward their outer ends, somewhat, as indicated in Fig. 6, whereby the ears delivered to them will gradually work downward to their outer or delivery ends. Their inner ends are each provided with a gear 23 meshing with one another whereby they will rotate in opposite directions or toward one another, and means is employed for imparting rotation to them. Said means may be, for example, a sprocket 24 mounted on the shaft of one of the rolls in a manner whereby while driving the same it will have a free rocking movement after the manner of a knuckle-joint connection. This has not been shown fully since such a form of driving connection is well known. But it provides that though the rolls do not lie exactly at right angles to the plane of rotation of said sprocket yet they will be properly driven.

As shown in the drawing the husking rolls are each furnished with a series of annular spaced flanges, which, in extending beyond the peripheries of the rollers as shown, hold the latter apart. The flanges of one roller lie between those of the other and upon the body of the same. This structure provides for the positive removal of the husk and silk since the thin flange can more easily take hold of these parts than a roller having surfaces of considerable extent.

25 is a shaft mounted in extensions of the bearing J', Fig. 6, one end carrying a sprocket 26 which imparts movement to the said sprocket 24 by a chain 27. The other end of the shaft has a beveled gear 28 in mesh with a similar gear 29 on the lower end of the shaft H'. By this means motion imparted to the said shaft H' from the master wheel D through the shafts R, 15 and 19 drives the said husking rolls, and the latter are properly timed to rapidly remove the husks from the ears, their rapidity of movement also somewhat accelerating the downward movement of the ears to the discharge end.

Supported pivotally in any suitable manner upon the frame at the said discharge end of the rolls is an elevator 30 in position to receive the ears from the latter, the elevating member 30' in said elevator receiving motion through any usual shaft 31, driven by a beveled gear 32 in mesh with a similar gear 33 on the shaft 34 lying parallel to the axle of the master wheel and driven from the latter through a sprocket chain 35.

I provide a valve near the lower end of the snapping rolls M which is designed to readily permit the entrance of the stalks between the rolls but prevents the ears when snapped therefrom from leaving the machine, this being employed in conjunction with a guard erected at a sufficient height to form an inclosure and guide for the said ears and now to be described.

In Figs. 1 and 2, 36 indicates a deck, one edge of which lies close to the periphery of one of the snapping rolls. Arising from its outer or opposite edge is a vertical guard 37 extending at an angle from near the upper part of said roll down to and overhanging both the husking rolls, there being a sufficient space between the lower edge of the same and the rolls to permit the passage of the ears to be husked. The forward edge of the deck also has a vertical guard 38 secured at one end in a suitable manner to the guard 37. To its other end is hingedly secured a plate 39 forming the valve previously mentioned. Preferably the free end of this valve overlies one of the snapping rolls, being inclined at an angle to the longitudinal axis of the same, that is, by extending in a rearward direction. The stalks are thus guided more directly between the rolls assisted by a stationary guard 40 disposed at an opposite angle as shown. Said valve is adapted to open inwardly or rearwardly to permit the stalks to enter and it is yieldingly held in the closed position shown by any suitable means, I having indicated as an example of such means, a rod 41 curved substantially as shown, being a part of a circle described from the pivot point of the valve. A spring 42 encircles the rod and holds the valve closed. 43 is a member erected beyond the position of the valve and serves to guide and direct the snapped ears to and upon the deck 36 and thence through the husking rolls. It is observed that I employ guards 44 and 45, one at each side of the machine, whose inner edges overlie the snapping rolls. These support the stalks as they pass through the rolls so that they will not hang over the sides of the machine and also to form an inclosure for and to catch the ears snapped from the stalks. The lower edge of the guard 45 is raised sufficiently above the roll nearest the deck 36, which it overhangs, to permit the ears to pass beneath it to reach the said deck 36. This has been indicated in Fig. 1 wherein the largest part of said guard has been removed.

I have referred to a device for adjusting the machine whereby to obtain various elevations of the same and I have illustrated one form of the usual mechanism for so doing in order to give a full understanding. The axle of the master-wheel D is provided with a rotative sleeve, not shown, which carries at each end a pinion 46, said sleeve being further provided with a worm-wheel 47 engaged and rotated by a worm 48 mounted on a crank shaft 49 having bearings on said sleeve.

50 is a link secured on the frame A and provided with teeth 51 in its interior, one of said links lying at each side of the wheel to receive the pinions 46 mentioned. Rotation of the worm imparts movement to the worm-wheel and finally to the pinions 46, which naturally ride up and down within the links due to the teeth 51, thereby providing an adjustable relation between the frame and the wheel-axle. Any desired adjustment for height is thus obtained with ease.

It is observed that the forward ends of the rolls M overlie the sprockets G and the chains E as clearly shown, in Fig. 2, and this provides that the said chains will positively carry the stalks into the rolls which is important since it is absolutely necessary that the rolls positively grasp and hold the stalks. The valve 39 may be placed farther forward with relation to the rolls, if desired, its proper position being determined by the results obtained. Now, as the machine moves forward the stalks are carried into the rolls by the chains E and the rapid revolution of the said rolls pulls the said stalks downward, as in Fig. 5, the ear being snapped from the stalk upon reaching the rolls through which, of course, they cannot pass. The stalk is more or less compressible whereas the ripe ear is hard and must, of course, be pulled from the stalk or rather the latter must be pulled from it. Upon being liberated the ears descend by gravity along the rolls M upon the deck, as the case may be, and are guided by the member 43 or the valve 39, or both, toward the husking rolls 22, the deck 36 likewise assisting in this, there being an opening 36' therein above the rolls through which the ears pass to them. In their movement along said rolls the ears are husked as is usual with rolls of the husking type. The cleaned ears pass beneath the guard portion 38 and finally enter the elevator and are deposited in a wagon or other receptacle moving alongside, the husks being removed from the machine by any desired method. The deck 36 overlies the gearing in control of the rolls 22 thereby protecting the same from the litter incident to the picking and husking operation and the gearing at the rear of the machine for driving the snapping rolls may also be protected in any desired manner for the same purpose, though the protecting means have not been indicated since they are no part of my invention. Likewise, the gearing which imparts movement to the sprocket chains E E may also be protected but this will be naturally suggested to a skilled person. The arches C and the gears O for the snapping rolls are not in the path of the stalks for the reason that the rapid rotation of the rolls draws said stalks down out of the way. As has been previously pointed out, therefore, the path for the stalks is an entirely clear one. Evidently, the machine may be used merely for picking corn by eliminating the husking rolls and the parts for driving the same, if desired, in which case the ears may be delivered directly into any receptacle and afterward husked. My preference, however, is to pick and husk at one operation.

By having the snapping rolls inclined upwardly at an angle the stalks are more properly and quickly handled than would result with rollers lying substantially in a horizontal position or even when erected near a vertical position as some are arranged. That is to say, their lower ends may lie near enough to the ground to pick up stalks that may be partially lying down while their inclination is such, and their upper ends extend to such a height that the stalks will be rapidly disposed of. Rolls if lying horizontally and low enough to receive all of the stalks as they may stand or lie in promiscuous order will necessarily require a longer time to draw the stalks through them whereas if high enough to reduce the amount of stalks to be carried through they would only receive such as stood in an upright or a nearly upright position. Rolls that stand vertically or nearly so cannot readily receive the stalks without specially formed retaining surface structures in them and even then they cannot properly gather the stalks as they must of necessity assist in doing if a practical machine is to be expected. Again, by placing the husking rolls adjacent and at right angles to the snapping rolls where they will receive the ears to be husked the machine can be more simply constructed and compactly built besides using said husking rolls as a discharge chute to the elevator so that the latter member can be kept at the side of the machine where it properly belongs.

I have stated that the frame of the machine may be raised and lowered and this may be done in any desired manner and by any suitable means and may include tilting the machine downwardly at its forward end whereby the gathering member E may more nearly approach the bases of the stocks all of this, however, being within the meaning of the invention. I desire to state also that the structures and arrangement of the parts of the machine may be altered in various ways whereby to obtain the best results with the simplest forms of mechanisms without departing from the spirit and intent of the invention. For example, the relation of the rolls to each other may be altered as well as their relation to the other parts, and also the arrangement of the driving mechanism and its connection with the parts performing the work.

Machines of this type are usually constructed in such a way that the framing or other parts of the machine lie directly behind the snapping rolls and more often than otherwise these parts are often quite close to the ground. It is the desire of the farmer to leave the stalks standing in as nearly an upright position as possible after the corn has been picked, in order that a machine for gathering said stalks may pass through the field and readily harvest them. If the corn picking machine drags the stalks down into inclined positions the machine for harvesting the stalks, of course, can accomplish very little. It is, therefore, my purpose to construct my corn harvesting machine so that the stalks after passing through the snapping rolls, the upper ends of which are of a height equal to or nearly the height of an average stalk will remain in upright positions the frame portion upon which the upper ends of the snapping rolls are carried, as well as the gear O being the lowest portion of the machine at the rear.

It is observed that the power is applied to the snapping rolls through the inclined shaft R whose beveled pinion Q engages the beveled gear P of one of them, while motion is transmitted to one of the chains E through the vertical shaft 15 and the shaft 19 lying at one side of the line of stalks. Again, the other chain is given its motion through the vertical shaft 6, Fig. 5, and the shaft 10 both of which lie at the other side of the stalk-row. By this means and from the fact also that the frame parts C are arched, as shown, nothing lies in the path of the stalks as the machine passes through the field except that part of the machine which carries the upper ends of the said snapping rolls as stated. This is a distinct advantage for the reasons already stated.

The disposition of the guard 43 above one of the snapping rolls M, and the valve 39 adjacent to it, provide for the ready guiding of the ears from the snapping rolls upon the deck 36 to the husking rolls. The slanting parts of the platform K, together with the chains E, and the beveled forward ends of the snapping rolls, provide for the proper guiding of the stalks into the latter and it is only necessary that the valve 39 open a sufficient distance to permit the stalks to push it aside so as to enter behind it whereupon it immediately closes. The guard 43 and said valve are set at such an angle relatively to the longitudinal line of the rolls that the ears must be guided to the said deck 36. This is a simple arrangement of valve mechanism that is of low cost.

Having described my invention, I claim:—

1. In a corn harvesting machine, the combination of the main frame, a pair of rolls journaled thereon and inclined upwardly and rearwardly, means to rotate them, a guard extending longitudinally of each roll and inclined at an angle upwardly therefrom to form a trough, the edge of one of them being spaced above its respective roll, a deck beneath the last mentioned guard and lying adjacent the said roll, a member extending between the said guard and the deck and forming an inclosure and receptacle at one side of the roll, and means overlying the rolls at their lower ends to retain the ears including a valve overlying one of the rolls.

2. In a corn harvesting machine, the combination of the main frame, a pair of rolls journaled thereon and inclined upwardly and rearwardly, means to rotate them, a guard extending longitudinally of each roll and inclined at an angle upward therefrom to form a trough, the edge of one of them being spaced above its respective roll, a deck beneath the last mentioned guard and lying adjacent the said roll, a member extending between the said guard and the deck and forming an inclosure and receptacle at one side of the roll, there being an opening below the lowermost part of the deck, means below said opening to receive and convey away the ears of corn, and means overlying the rolls at their lower ends to retain the ears including a valve overlying one of said rolls.

3. In a corn harvesting machine, the combination of the main frame, a pair of rolls journaled thereon and inclined upwardly and rearwardly at an angle parallel to the direction of advance, a guard adjacent each roll and inclined at an angle upwardly from each substantially in the form of a hopper, one of said guards being spaced above the roll to which it lies adjacent, a deck beneath the last named guard adjacent the roll, and lying below the level of the space between the roll and said guard, the deck and said guard constituting a receptacle, means overlying the rolls near their lower ends for directing the ears of corn toward the receptacle comprising a stationary part overlying the roll lying farthest from the receptacle and inclined at an angle toward the upper end of the roll and terminating at its other end at a position above the rolls where they adjoin, and a valve pivotally supported at one end in a substantially upright position, its other end lying adjacent the terminus of said stationary part and inclined at that end toward the upper ends of the rolls, and means to hold the valve elastically in its closed position.

4. In a corn harvesting machine the combination with a drive wheel, the main frame, a pair of inclined snapping rolls mounted on the frame, and feeding devices at the lower ends of the rolls to introduce the corn stalks to said rolls, of a shaft operated by said drive wheel, a gear thereon, a gear on one of the rolls with which the gear of said shaft engages, a gear on each roll in mesh with each other, a second gear on the described shaft, means engaging and driving one of the feeding devices and in engagement with the said second gear, means engaging and driving the other of the said feeding devices and a gear carried by the roll at that side with which the last said means engages and by which it is driven.

5. In a corn harvesting machine the combination with a drive wheel, the main frame, a pair of inclined snapping rolls mounted on the frame, feeding devices at the lower ends of the rolls to introduce the corn stalks to said rolls, and means at the lower ends of the rolls to carry away the snapped ears, of a shaft operated by said drive wheel, a gear thereon, a gear on one of the rolls with which the gear of said shaft engages, a gear on each roll in mesh with each other, a second gear on the described shaft, means engaging and driving one of the feeding devices and in engagement with the said second gear, means engaging and driving the other of the said feeding devices, and a gear carried by the roll at that side with which the last said means engages and by which it is driven, and means driven from one of the feeding devices and operatively engaging the means that carries away the snapped ears.

In testimony whereof I affix my signature, in presence of two witnesses.

PETER J. STAAB.

Witnesses:
ELSIE WILKINSON,
EUNICE BECKUM.